C. B. LAWTON.
BRICK, TILE, &c.
APPLICATION FILED JAN. 31, 1910.

997,303. Patented July 11, 1911.

WITNESSES:  
INVENTOR  
Charles B. Lawton  
by Christy & Christy  
Atty's

UNITED STATES PATENT OFFICE.

CHARLES B. LAWTON, OF PENN TOWNSHIP, ALLEGHENY COUNTY, PENNSYLVANIA.

BRICK, TILE, &c.

997,303. Specification of Letters Patent. Patented July 11, 1911.

Application filed January 31, 1910. Serial No. 541,112.

*To all whom it may concern:*

Be it known that I, CHARLES B. LAWTON, residing in Penn township, in the county of Allegheny and State of Pennsylvania, a citizen of the United States, have invented or discovered certain new and useful Improvements in Bricks, Tiles, &c., of which improvements the following is a specification.

The invention herein described relates to faced bricks, tiles, etc., and has for its object a facing formed of glass, etc., and provided with a rib extending along the back of the face and adapted to be embedded in the material forming the body of the brick, etc.

It is a further object of the invention to provide a facing with inwardly turned ends adapted to overlap the ends of the body portion, such turned in portions being braced by the rib along the back of the facing.

Figure 1:
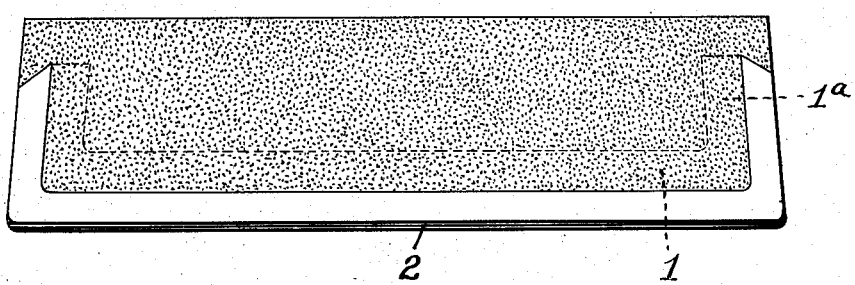
Figure 2:
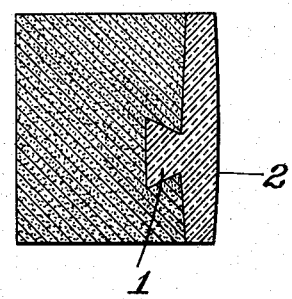
Figure 3:
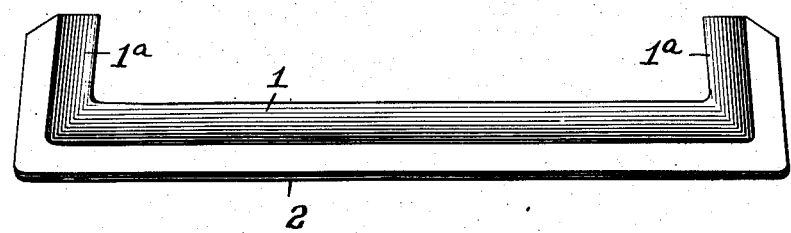

In the accompanying drawings forming a part of this specification Figure 1 is a sectional elevation of a brick having the improved facing incorporated therewith. Fig. 2 is a transverse section of the brick and Fig. 3 is an edge elevation of the facing.

In the practice of my invention the facing is formed of suitable material as glass or other vitreous substance. When formed of glass the latter in a molten or plastic condition is shaped in a suitable mold preferably by pressure. In this forming or shaping operation a rib 1 is formed along the back of the facing plate 2, this rib which is preferably given a dovetail shape in cross section not only affords a means whereby the body portion 3 of the brick, etc., and the facing plate may be firmly secured together but also adds materially to the strength of the facing plate and therefore permits of the use of comparatively thin plates. It is preferred that the facing plate should be formed with end walls 4 which will form more or less of the end walls of the completed brick. It is also preferred that the ribs 1 should extend inwardly along the inner walls of the portions 4 as shown at 1ª. After the facing plate has been formed it is placed in a suitable mold and the concrete, clay, or other suitable material packed therein, to form the body portion of the brick, etc. It is preferred to use concrete in forming the body portion so that no great heat will be necessary in hardening the same.

It has been found that the facing plate is less liable to injury in manufacture if the outer surface be curved transversely as shown in Fig. 2.

The rib, while desirable to securely attach the facing to the body of the brick, performs a more important function in strengthening the facing especially at the junction of the end wall and the body or front of the facing. There is more or less expansion and contraction in all bricks due to atmospheric changes and without the strengthening rib such changes of dimensions frequently cause breaking off of the end walls. And further this rib prevents distortion of the end walls during the manufacture of the facing, especially during annealing.

I claim herein as my invention:

1. A vitreous facing for brick consisting of a front or body portion and a wall extending backwardly at an angle to the front and integral therewith, and a rib integral with the inner faces of the front portion and the backwardly extending wall and extending across and reinforcing the angle formed by said parts of the facing.

2. A vitreous facing for brick consisting of a front or body portion, walls extending backwardly from opposite edges of the front portion, and a rib integral with the inner faces of the front and the angularly arranged walls and extending across and reinforcing the angles formed by said parts of the facing.

3. A brick having in combination a body portion and a vitreous facing consisting of a front portion and end walls covering the front and ends of the body portion of the brick, and a dovetailed rib integral with the front and end walls of the facing and extending across and reinforcing the angle between said portions said ribs projecting into the body portion of the brick and uniting it with the front and end walls of the facing.

In testimony whereof, I have hereunto set my hand.

CHARLES B. LAWTON.

Witnesses:
SUE B. FRITZ,
FRANCIS J. TOMASSON.